United States Patent
Sasaki et al.

(10) Patent No.: US 9,484,048 B2
(45) Date of Patent: Nov. 1, 2016

(54) MAGNETIC HEAD WITH A HEATING ELEMENT BETWEEN THE READ AND WRITE ELEMENT AND METHOD OF MANUFACTURING THEREOF

(75) Inventors: Shinji Sasaki, Ibaraki (JP); Takateru Seki, Kanagawa (JP); Masayuki Kurita, Kanagawa (JP); Toshiya Shiramatsu, Kanagawa (JP)

(73) Assignee: HGST Netherlands B.V., Amsterdam (NL)

(*) Notice: Subject to any disclaimer, the term of this patent is extended or adjusted under 35 U.S.C. 154(b) by 1396 days.

(21) Appl. No.: 12/623,151

(22) Filed: Nov. 20, 2009

(65) Prior Publication Data
US 2010/0134915 A1   Jun. 3, 2010

(30) Foreign Application Priority Data

Dec. 4, 2008 (JP) ................................. 2008-309719

(51) Int. Cl.
| | |
|---|---|
| G11B 11/00 | (2006.01) |
| G11B 5/31 | (2006.01) |
| B24B 37/04 | (2012.01) |
| G11B 5/60 | (2006.01) |
| G11B 5/39 | (2006.01) |

(52) U.S. Cl.
CPC ............ *G11B 5/314* (2013.01); *B24B 37/042* (2013.01); *G11B 5/3136* (2013.01); *G11B 5/6064* (2013.01); *G11B 5/3967* (2013.01); *Y10T 29/49032* (2015.01)

(58) Field of Classification Search
None
See application file for complete search history.

(56) References Cited

U.S. PATENT DOCUMENTS

| | | | |
|---|---|---|---|
| 2004/0037012 A1* | 2/2004 | Nakanishi et al. | 360/317 |
| 2004/0075942 A1 | 4/2004 | Bajorek | 360/122 |
| 2006/0232885 A1* | 10/2006 | Heng et al. | 360/235.7 |
| 2007/0211385 A1* | 9/2007 | Kondo et al. | 360/236.1 |
| 2007/0247758 A1* | 10/2007 | Kurita et al. | 360/234.7 |
| 2008/0014467 A1* | 1/2008 | Ohtsu et al. | 428/811.4 |
| 2008/0019050 A1* | 1/2008 | Kameyama | 360/235.4 |
| 2008/0080094 A1* | 4/2008 | Tani et al. | 360/234.3 |
| 2008/0212234 A1* | 9/2008 | Ohtsu | 360/234.5 |
| 2008/0239584 A1* | 10/2008 | Anagawa et al. | 360/319 |
| 2009/0168248 A1* | 7/2009 | Matsumoto et al. | 360/235.7 |
| 2009/0296536 A1* | 12/2009 | Nagai | 369/13.24 |

FOREIGN PATENT DOCUMENTS

| | | | |
|---|---|---|---|
| JP | H04366408 A | 12/1992 | |
| JP | 2004/241092 | 8/2004 | ............ G11B 21/21 |
| JP | 2004/241105 | 8/2004 | ............ G11B 5/31 |
| JP | 2006/040447 | 2/2006 | ............ G11B 5/31 |
| JP | 2007287277 A | 11/2007 | |

* cited by examiner

*Primary Examiner* — Andrew Sasinowski
*Assistant Examiner* — Henok Heyi
(74) *Attorney, Agent, or Firm* — Zilka-Kotab, PC

(57) ABSTRACT

According to one embodiment, a magnetic head includes a write element, a read element, and a heating element disposed between the write element and the read element. When power is applied to the heating element, either the read element or the write element projects beyond a plane of an air-bearing surface (ABS) of the magnetic head, and when power is not applied to the heating element, a portion of the ABS of the magnetic head facing a magnetic disk close to the heating element has a concave shape. In another embodiment, when power is applied to the heating element, at least one of a portion of the read element and a portion of the write element approaches a magnetic disk, and when power is not applied to the heating element, a portion of the ABS of the magnetic head facing a magnetic disk close to the heating element has a concave shape.

8 Claims, 13 Drawing Sheets

MAGNETIC HEAD WITH A HEATING ELEMENT BETWEEN THE READ AND WRITE ELEMENT AND METHOD OF MANUFACTURING THEREOF

RELATED APPLICATIONS

The present application claims priority to a Japanese Patent Application filed Dec. 3, 2008, under Appl. No. 2008-309719, which is incorporated herein by reference.

FIELD OF THE INVENTION

The present invention relates to magnetic heads, and more particularly, to systems and methods for heating the read and write elements of a magnetic head.

BACKGROUND OF THE INVENTION

There is a growing demand for magnetic recording/reproducing devices which have an increased recording density due to the amount of information being stored increasing constantly. Specifically, there is a need for a magnetic head having high sensitivity and high output due to the demands for increased recording density. To meet such a requirement, efforts have been made to decrease a distance between a magnetic disk medium and a write element or a read element of the magnetic head. However, there are problems associated with each technique currently used.

One specific technique currently used, as described in Japanese Patent Office (JPO) Pub. No. JP-A-2004-241092, which is put to practical use, has a heating element provided near a head element, and a head element portion is heated during reading and/or writing data to/from a magnetic disk so that the portion is expanded (such that it protrudes toward the magnetic disk) so as to approach a surface of the magnetic disk. In a slider having the heating element, an air-bearing surface (ABS) projects near the heating element due to thermal expansion of the heating element and a peripheral member of the element, so that the ABS approaches the magnetic disk surface.

However, a position of the heating element does not always correspond to a position of the read element or the write element, leading to a problem where an ABS portion close to the heating element projects as shown in FIG. 3, and an interval between the ABS and a disk cannot be decreased further at a position of each of the write and read elements.

As an attempt for solving the problem, a method has been proposed, as described in JPO Pub. Nos. JP-A-2004-241105 and JP-A-2006-40447, in which power is applied to a heating element during polishing so that a portion to be projected is depressed beforehand. Furthermore, a method has been proposed, as described in JPO Pub. No. JP-A-2006-40447, in which heating elements are provided at two places in one magnetic head, including a place near an ABS and a place relatively spaced from the ABS, and the heating element near the ABS is heated during polishing of the ABS in a manufacturing process of the magnetic head.

However, these methods introduce more problems that have not been adequately dealt with, and prevent their uses from aiding the manufacturing of magnetic heads.

SUMMARY OF THE INVENTION

According to one embodiment, a magnetic head includes a write element, a read element, and a heating element disposed between the write element and the read element. When power is applied to the heating element, either the read element or the write element projects beyond a plane of an air-bearing surface (ABS) of the magnetic head, and when power is not applied to the heating element, a portion of the ABS of the magnetic head facing a magnetic disk close to the heating element has a concave shape.

In another embodiment, a magnetic head includes a write element, a read element, and a heating element disposed between the write element and the read element. When power is applied to the heating element, at least one of a portion of the read element and a portion of the write element approaches a magnetic disk, and when power is not applied to the heating element, a portion of the ABS of the magnetic head facing a magnetic disk close to the heating element has a concave shape.

According to another embodiment, a magnetic head includes a write element, a read element, and a heating element provided between the write element and the read element. When power is applied to the heating element and an amount of deformation of an ABS surface toward the magnetic disk is plotted on a surface parallel to the magnetic disk, $R_2=d_2/W_2$, where a maximum of an amount of deformation toward the magnetic disk is $d_2$ and an average radius of a plot at a portion of $d_2/2$ is $W_2$. Also, when power is not applied to the heating element, a portion of the ABS of the magnetic head facing a magnetic disk close to the heating element has a concave shape. In addition, $R_1=d_1/W_1$, where $d_1$ is a depth of a deepest portion of a concave shape on the plot, and $W_1$ is an average diameter of the concave shape at a portion of $d_1/2$, and $R_1 \geq 2*R_2$.

A magnetic head, according to another embodiment, includes a write element, a read element, and a heating element provided between the write element and the read element. When power is not applied to the heating element, a portion of the ABS of the magnetic head facing a magnetic disk close to the heating element has a concave shape, and a depth of a deepest portion of the concave shape is about 5 nm to about 20 nm, and an average diameter of the concave shape at a portion of $d_1/2$ is less than about 20 µm.

In another embodiment, a method of manufacturing a magnetic head having a write element, a read element, and a heating element provided between the write element and the read element, includes cutting into strip row bars a wafer substrate on which a plurality of the write elements and a plurality of the read elements are formed, such that the write elements and the read elements are arranged in a line, and polishing each cut surface such that a dimension in a direction perpendicular to the cut surface of each of the write elements and the read elements has a desired value, and a flatness of each of the write elements and the read elements has a desired degree of flatness. Pulsed power with a constant interval is applied to the heating element when less than about 10 nm is remaining to remove via polishing.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

Figure 1:
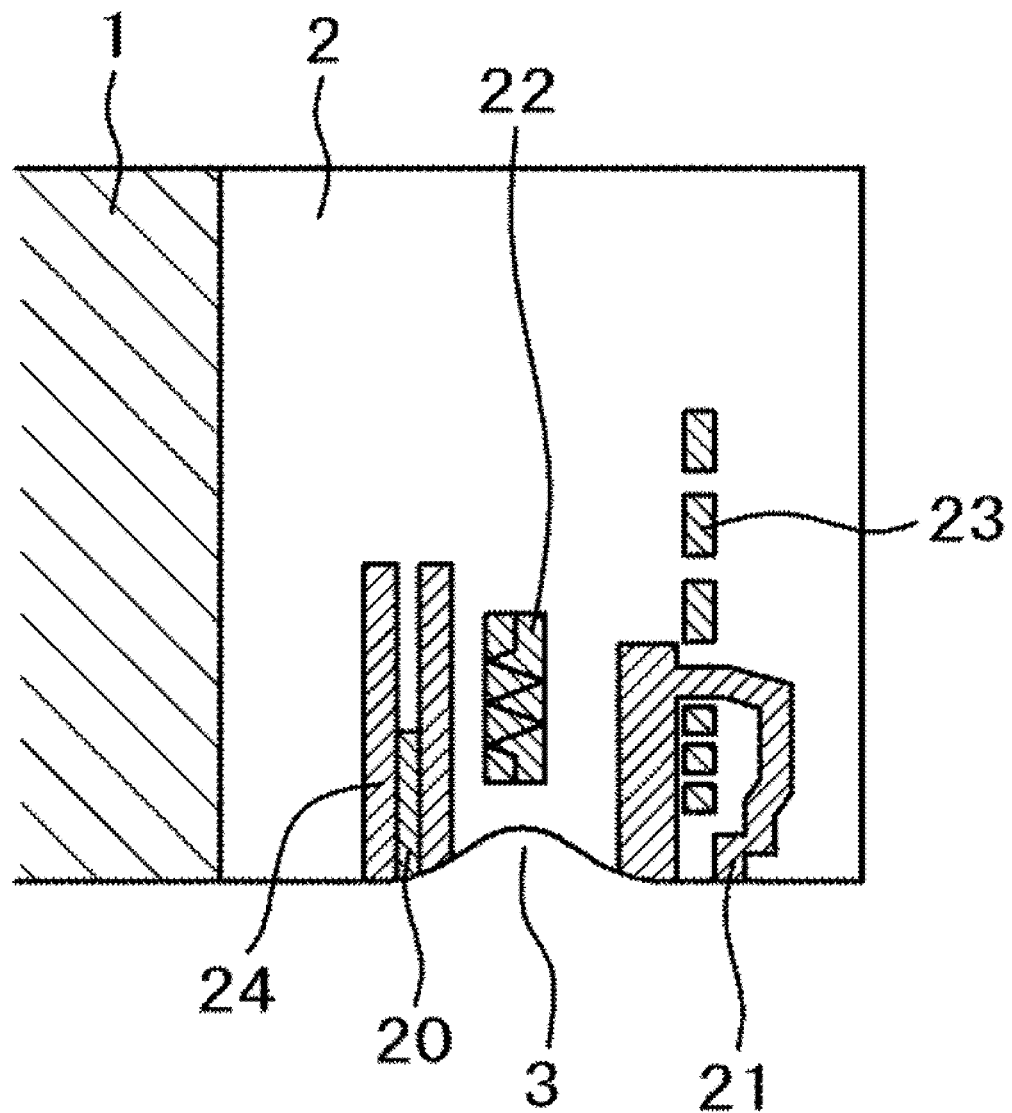
FIG. 1 is a section diagram showing a air-bearing surface of a magnetic head of the invention in the case that a heating element is not applied with power.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a magnetic head includes a write element, a read element, and a heating element disposed between the write element and the read element. When power is applied to the heating element, either the read element or the write element projects beyond a plane of an air-bearing surface (ABS) of the magnetic head, and when power is not applied to the heating element, a portion of the ABS of the magnetic head facing a magnetic disk close to the heating element has a concave shape.

In another general embodiment, a magnetic head includes a write element, a read element, and a heating element disposed between the write element and the read element. When power is applied to the heating element, at least one of a portion of the read element and a portion of the write element approaches a magnetic disk, and when power is not applied to the heating element, a portion of the ABS of the magnetic head facing a magnetic disk close to the heating element has a concave shape.

According to another general embodiment, a magnetic head includes a write element, a read element, and a heating element provided between the write element and the read element. When power is applied to the heating element and an amount of deformation of an ABS surface toward the magnetic disk is plotted on a surface parallel to the magnetic disk, $R_2=d_2/W_2$, where a maximum of an amount of deformation toward the magnetic disk is $d_2$ and an average radius of a plot at a portion of $d_2/2$ is $W_2$. Also, when power is not applied to the heating element, a portion of the ABS of the magnetic head facing a magnetic disk close to the heating element has a concave shape. In addition, $R_1=d_1/W_1$, where $d_1$ is a depth of a deepest portion of a concave shape on the plot, and $W_1$ is an average diameter of the concave shape at a portion of $d_1/2$, and $R_1 \geq 2*R_2$.

A magnetic head, according to another general embodiment, includes a write element, a read element, and a heating element provided between the write element and the read element. When power is not applied to the heating element, a portion of the ABS of the magnetic head facing a magnetic disk close to the heating element has a concave shape, and a depth of a deepest portion of the concave shape is about 5 nm to about 20 nm, and an average diameter of the concave shape at a portion of $d_1/2$ is less than about 20 µm.

In another general embodiment, a method of manufacturing a magnetic head having a write element, a read element, and a heating element provided between the write element and the read element, includes cutting into strip row bars a wafer substrate on which a plurality of the write elements and a plurality of the read elements are formed, such that the write elements and the read elements are arranged in a line, and polishing each cut surface such that a dimension in a direction perpendicular to the cut surface of each of the write elements and the read elements has a desired value, and a flatness of each of the write elements and the read elements has a desired degree of flatness. Pulsed power with a constant interval is applied to the heating element when less than about 10 nm is remaining to remove via polishing.

In the method described in JPO Pub. No. JP-A-2004-241105, a depression shape is formed, which is mirror-symmetric to a projected shape formed during reading or writing by a read or write element. Therefore, in the case that the heating element is heated during read/write from/to a magnetic disk, an air-bearing surface (ABS) shape is changed such that an ABS is returned to a flat surface by the same power as power applied during polishing, and when power is further increased, an ABS shape is formed, in which the ABS projects about the heating element with the same curvature as in the case that the depression is not formed, and consequently the write element or the read element cannot be allowed to approach the magnetic disk.

Verification was made on the method as described in JPO Pub. No. JP-A-2006-40447, in which heating elements were provided at two places in one magnetic head, including a place near an ABS and a place relatively spaced from the ABS, and the heating element near the ABS was heated during polishing the ABS in a manufacturing process of the magnetic head. As a result, the following problem was encountered: since the element heated during polishing was relatively close to the ABS, a concave shape having larger curvature after polishing was made, but since two heating elements were used, and a heating element used for flying was provided at a position spaced from the ABS, a maximum deformation point of the ABS during processing did not correspond to a maximum deformation point thereof during flying, so that shape correction was not able to be made. If the two heating elements are made more close to the ABS to reduce such a difference, a curvature difference between a shape during processing and a shape during flying is eliminated, and consequently the problem cannot be solved.

According to one embodiment, a magnetic head is provided, in which a distance between a magnetic head element portion and a magnetic disk is decreased.

In some embodiments, some techniques may be used to solve the problems described above. A magnetic head having a write element and a read element, wherein a heating element is disposed between the write element and the read element, and when power is not applied to the heating element, an ABS facing a magnetic disk has a concave shape in a portion close to the heating element, and when power is applied to the heating element, either the read element or the write element projects beyond a plane of the ABS of the magnetic head.

In another embodiment, a magnetic head has a write element, a read element, and a heating element is disposed between the write element and the read element, and when power is not applied to the heating element, an ABS facing a magnetic disk has a concave shape in a portion close to the heating element, and when power is applied to the heating element of the magnetic head, either the read element or the write element approaches the magnetic disk.

In yet another embodiment, a magnetic head has a write element, a read element, and a heating element provided between the write element and the read element. When power is not applied to the heating element, an ABS facing a magnetic disk has a concave shape in a portion close to the heating element, and when depth of a deepest portion of the concave shape is $d_1$, and average diameter of the concave shape at a portion of $d_1/2$ is $W_1$, $R_1=d_1/W_1$, and when power is applied to the heating element, in the case that an amount of deformation of the ABS toward the magnetic disk is plotted on a surface parallel to the magnetic disk, when the maximum of the amount of deformation toward the magnetic disk is $d_2$, and average radius of the plot at a portion of $d_2/2$ is $W_2$, $R_2=d_2/W_2$, and the $R_1$ and the $R_2$ are in a relationship of $R_1 \geq 2*R_2$.

In another embodiment, a magnetic head has a write element, a read element, and a heating element provided between the write element and the read element. When power is not applied to the heating element, an ABS facing a magnetic disk has a concave shape in a portion close to the heating element, and when depth of a deepest portion of the concave shape is $d_1$, and average diameter of the concave shape at a portion of $d_1/2$ is $W_1$, $d_1$ is about 5 nm to about 20 nm, and $W_1$ is about 20 μm or less.

A method of manufacturing a magnetic head having a write element, a read element, and a heating element provided between the write element and the read element, in another embodiment, includes cutting into strip row bars a wafer substrate on which a plurality of the write elements and a plurality of the read elements are formed, such that the write elements and the read elements are arranged in a line, and polishing each cut surface such that a dimension in a direction perpendicular to the cut surface of each of the write elements and the read elements has a desired value, and a flatness of each of the write elements and the read elements has a desired degree of flatness. Pulsed power with a constant interval is applied to the heating element when less than about 10 nm is remaining to remove via polishing.

In additional embodiments, a time width, Tw, of 1 pulse of the pulsed power applied to the heating element during polishing is not more than half of a response time of change in shape of an ABS when the heating element is heated; and furthermore, pulse duty, Tw/Td, which is a ratio of Tw to an interval Td between pulses, is not more than about 0.25.

In even more embodiments, a time width, Tw, of 1 pulse or the pulsed power applied to the heating element during polishing is not more than half of a response time of change in shape of an ABS when the heating element is heated; and furthermore, pulse duty, Tw/Td, which is a ratio of Tw to an interval Td between pulses, is not more than about 0.1.

Also, in some embodiments, a time width of 1 pulse of the pulsed power applied to the heating element during polishing is about 200 μsec or less; and furthermore, an interval between a pulse and a next pulse is about 800 μsec or more.

According to some embodiments, a slider may be manufactured which can reduce a distance between a magnetic head and a magnetic disk. Thus, a high-density magnetic recording device can be achieved.

As has already been described, power is supplied to a heating element in a polishing step for processing an ABS of a slider, thereby the ABS can be processed into a concave shape. However, a shape of the ABS has not been suitable for recording and reproducing.

To cope with this, investigations to study how to enable such processing that a depression is shaped during polishing with larger curvature than curvature of an ABS projecting during reading and/or writing to/from a disk. As a result, it has been found that an ABS is polished while pulsed power is applied to a heating element of a magnetic head; thereby, a portion of a magnetic head, which is easily projected compared with a write element or a read element, was selectively removed prior to projecting the remainder of the magnetic head.

In this case, as input power to a heater, pulsed power, of which the pulse time is shorter than a time constant of surface deformation (desirably, not more than half of the time constant), is repeatedly applied to the heater at an interval longer than the time constant (desirably, at least four times as long as the time constant), thereby a desired depression shape can be obtained. In some approaches, since a heating element for applying power during processing is common to a heating element for heating during flying, a center (maximum point) of deformation of an ABS during processing can be allowed to correspond to a deformation center thereof during flying.

Figure 4:
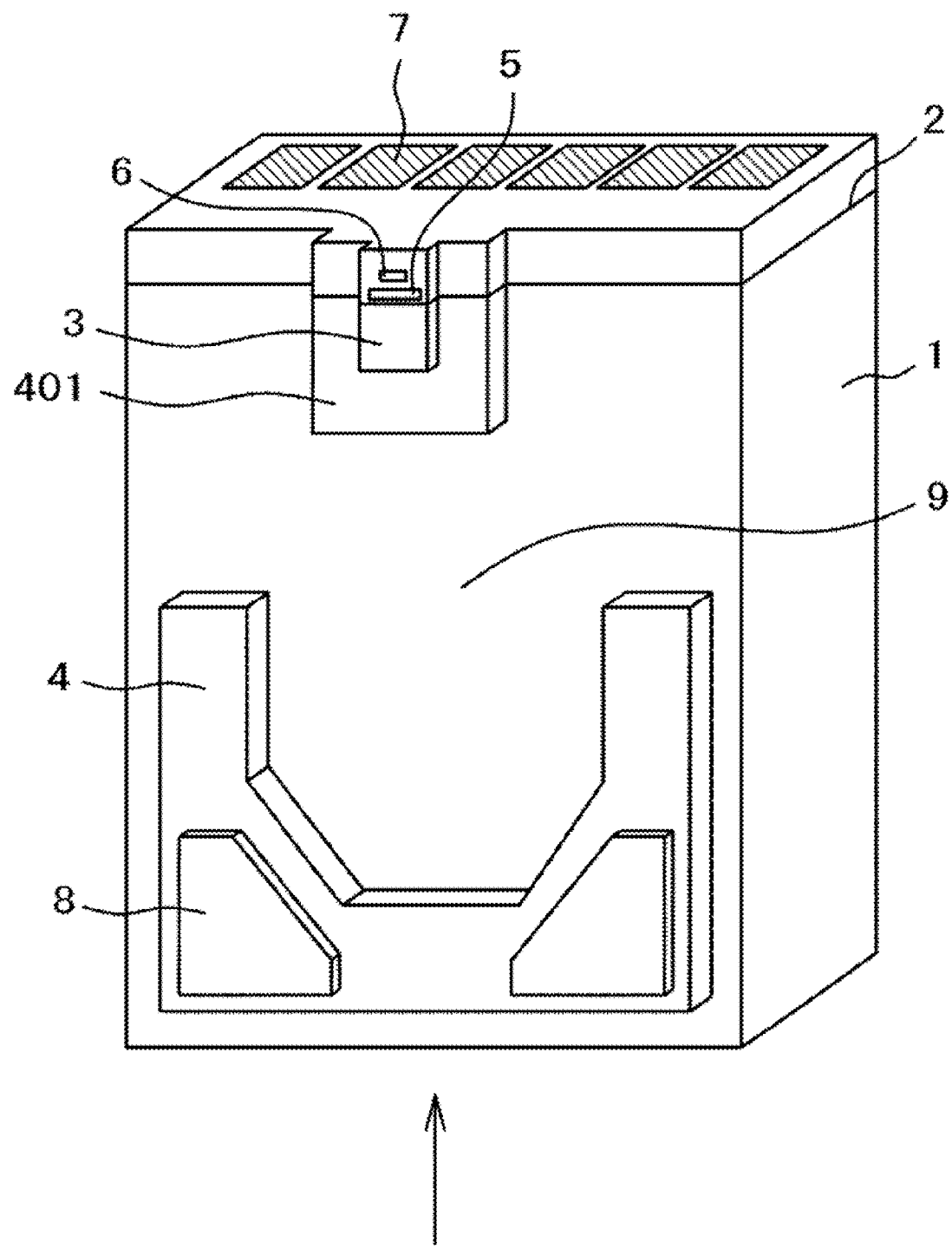
FIG. 4 is a perspective view of a magnetic head slider.

According to a first example, FIG. 1 shows a shape of an ABS of a magnetic head obtained according to one embodiment. FIG. 1 schematically shows an ABS shape in a center section of each of a read element 5 and a write element 6 on an ABS 3 of an element portion of a magnetic head (hereinafter, sometimes referred to as slider) shown in FIG. 4. FIG. 4 is a perspective view of the magnetic head, according to another embodiment.

In FIG. 4, the magnetic head is divided into a magnetic head ceramic substrate portion 1 and a magnetic head element portion 2. The magnetic head ceramic substrate portion 1 is formed of, for example, a sintered body of $Al_2O_3$ and TiC. Of course, any other suitable materials may be used, as are known to one of ordinary skill in the art. The magnetic head element portion is formed of for example, a sintered body of $Al_2O_3$. Of course, any other suitable materials may be used, as are known to one of ordinary skill in the art. Inflow end ABS's 8, each surface having an approximately triangle shape, are formed on the magnetic head ceramic substrate portion 1, and shallow groove portions 4 are formed under the inflow end ABS's 8, respectively.

A magnetic disk, according to another embodiment, moves in a direction of an arrow as shown in FIG. 4. Thus, air flows into a space formed by the shallow groove portions 4 and the leading edge ABS's 8, allowing the magnetic head to fly from the magnetic disk.

In the magnetic head element portion 2, the read element 5 and the write element 6 are formed. Since the read element 5 and the write element 6 are made close to a surface of the magnetic disk, the read element 5 and the write element 6 are formed on the ABS 3 of the element portion. The ABS 3 of the element portion and the inflow end ABS 8 are formed at the same level. The ABS 3 of the element portion is formed on a shallow groove portion 401 of the element portion. The shallow groove portion 401 of the element portion is at the same level as the shallow groove portions 4 formed in the magnetic head ceramic substrate portion. While the ABS 3 of the element portion is divided into a portion on the magnetic head element portion 2 and a portion on the magnetic head ceramic substrate portion 1 in FIG. 4, the two portions are in the same plane.

In the magnetic head element portion 2, the read element 5 and the write element 6 are formed. A not shown heating element is formed between the read element 5 and the write element 6. Moreover, electrode pads are formed on the magnetic head element portion 2 in order to supply a recording signal to the read element 5, extract a reproducing signal from the write element 6, or supply power to the heating element.

FIG. 1 is a section diagram of the magnetic head element portion according to one embodiment. As a feature of the magnetic head, a heating element 22, which is flowed with a current and thus heated, is formed between a read element portion 5 configured of a read element 20 and a shield 24, and the write element 6 configured of a write element main pole 21, a coil 23 and a magnetic circuit, and while not shown, each end of the heating element is connected to a different one of the electrodes pads 7.

A shape of the ABS 3 of FIG. 1 forms a mortar-like depression between the read element and the write element and around a portion close to the heating element. The ABS 3 has a flatness within about ±2 nm except the depression portion, and the depression in the example has a depth of between about 5 nm and about 10 nm, and a deformation area of the depression is about 20 μm to about 50 μm in diameter.

Figure 5:
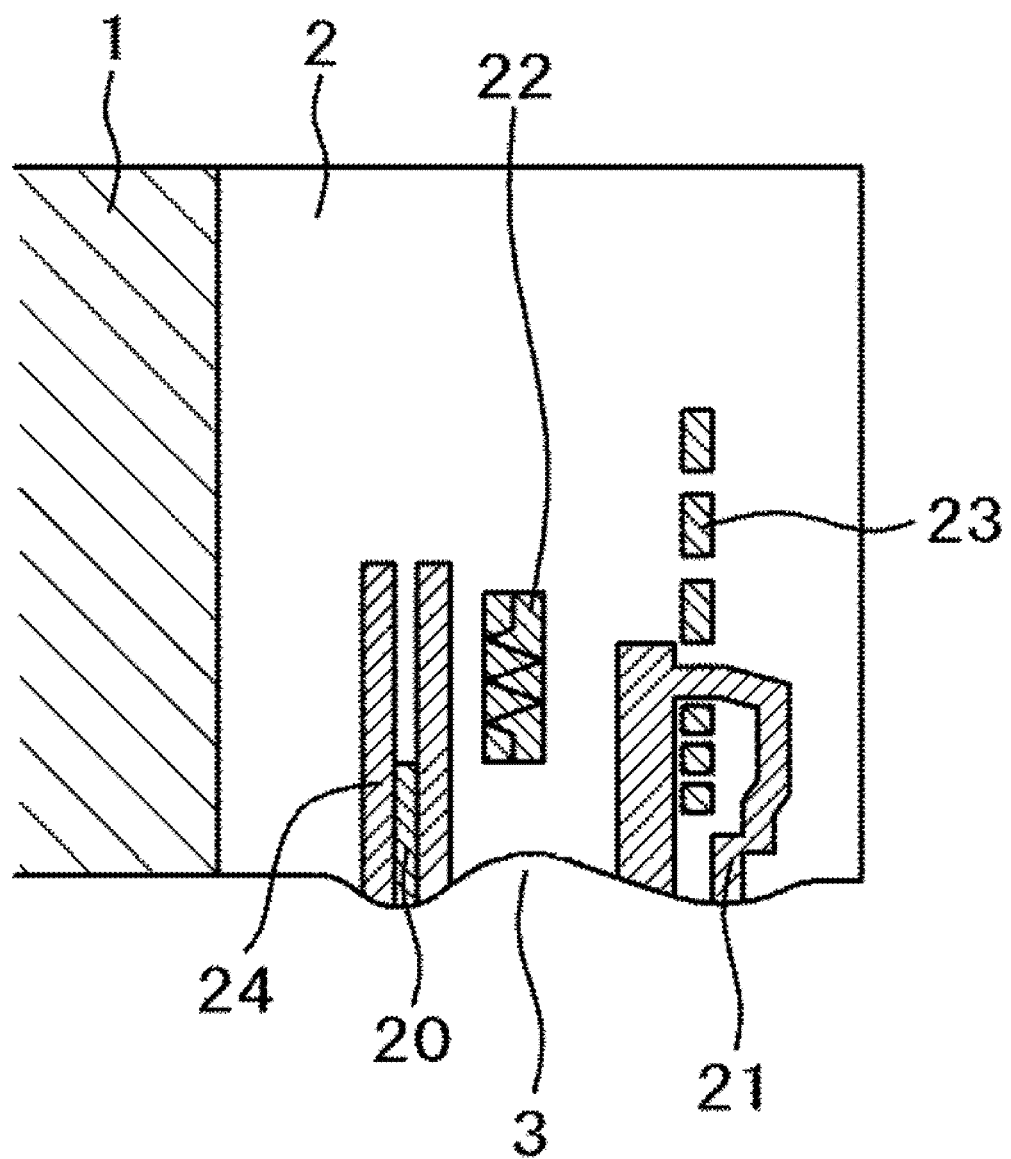
FIG. 5 is a section diagram showing a air-bearing surface of the magnetic head according to the invention in the case that the heating element is applied with power.

FIG. 5 shows an ABS shape when a magnetic head having the ABS shape shown in FIG. 1 flies over a rotating magnetic disk, according to one embodiment, and current is applied to the heating element 22, so that the ABS 3 is projected and thus gets close to a magnetic disk surface.

As shown in FIG. 5, the magnetic head, according to one embodiment, is formed such that the magnetic head is heated by the heating element 22, then each end of the read element 5 and the write element 6 projects beyond a plane of the surface compared with other portions. Therefore, since a distance between the magnetic head and the magnetic disk is minimized at each end of the read element 5 and the write element 6, recording density or reproducing accuracy can be increased or improved.

Figure 2:
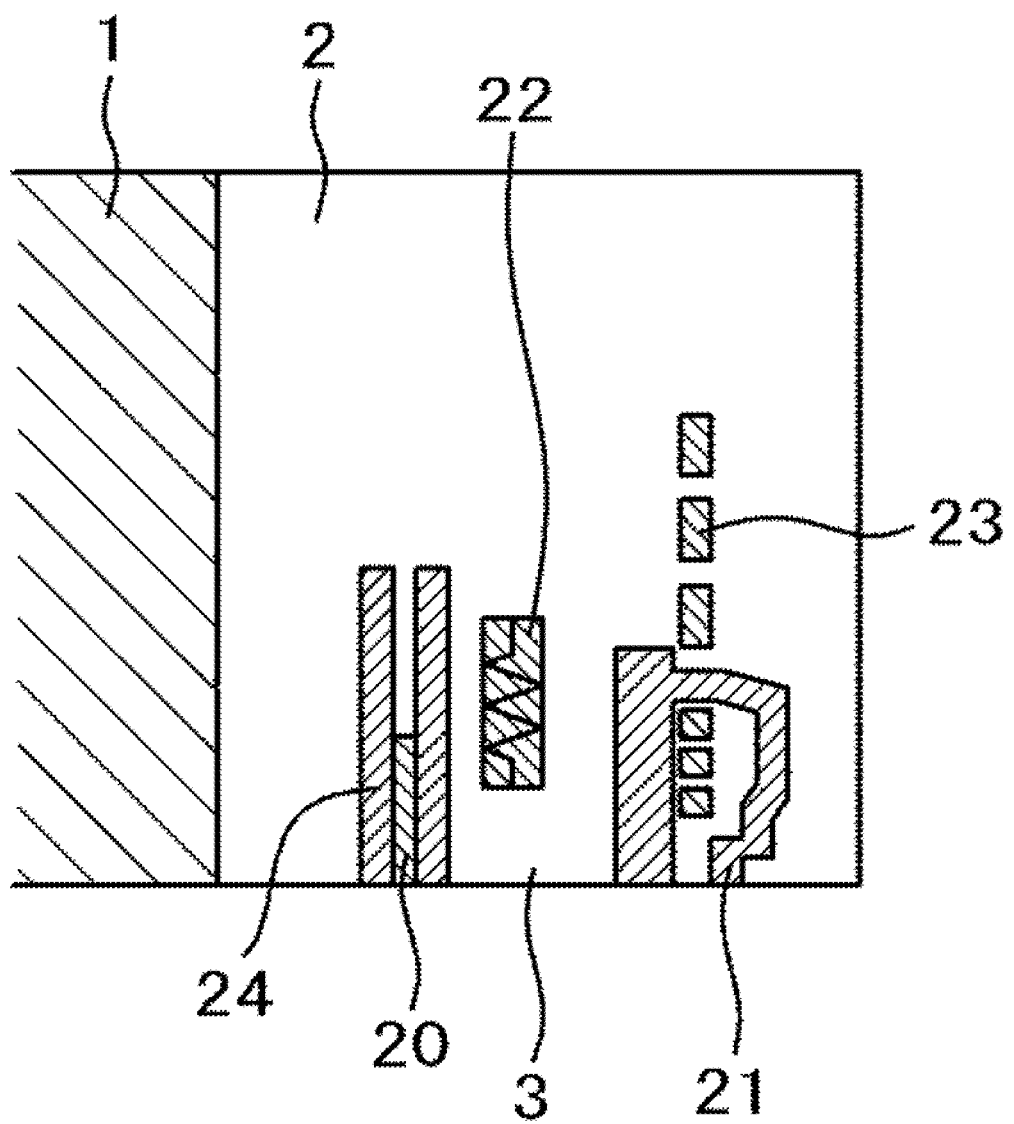
FIG. 2 is a section diagram showing a air-bearing surface of a magnetic head of a prior-art example in the case that a heating element is not applied with power.
Figure 3:
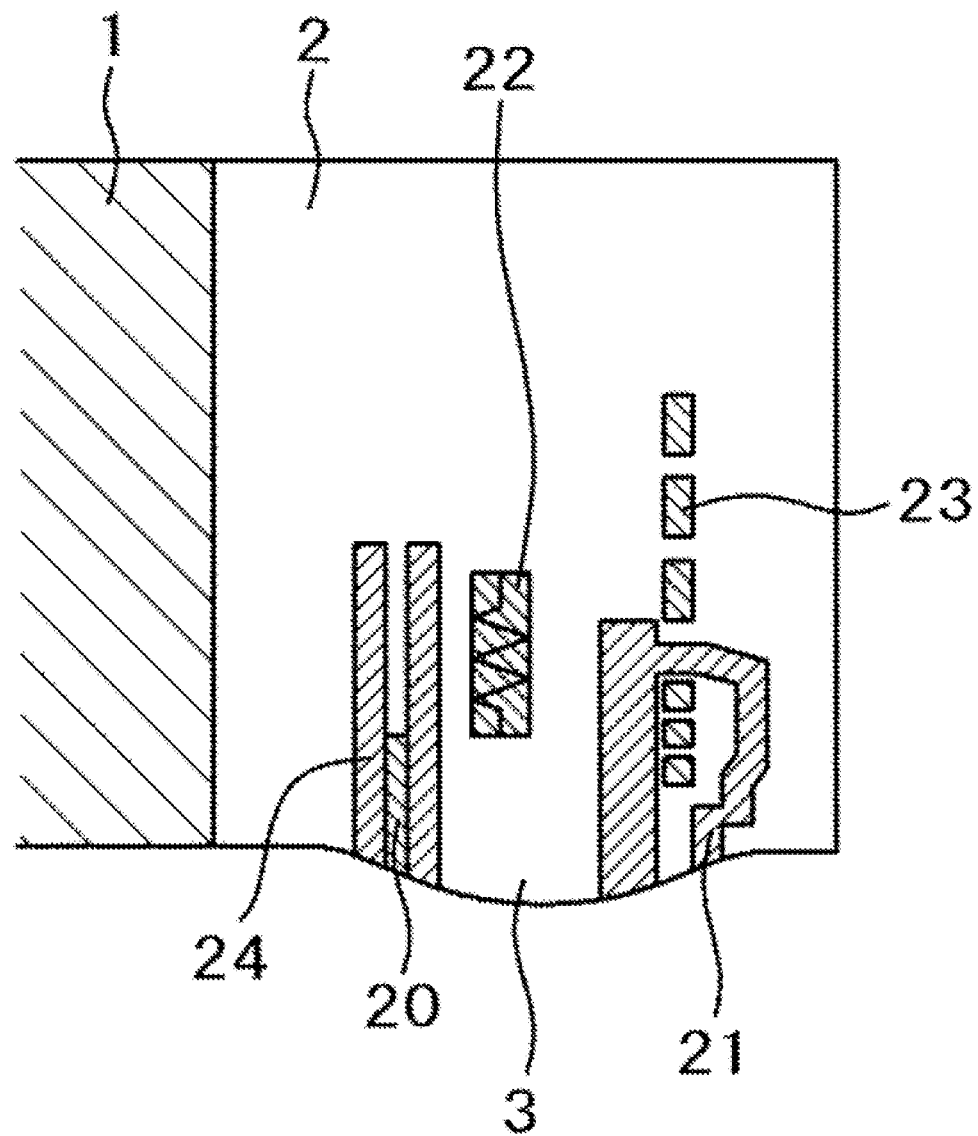
FIG. 3 is a section diagram showing a air-bearing surface of a magnetic head of the prior-art example in the case that the heating element is applied with power.

On the other hand, in a previous magnetic head, an ABS has a flat shape having a flatness within ±2 nm as shown in FIG. 2. In FIG. 2, a configuration of each of a read element 5, a write element 6, and a heating element 22 is the same as that described in FIG. 1. FIG. 3 shows an ABS shape of the previous head where the head flies over a rotating magnetic disk, the heating element 22 is applied with a current so that an ABS 3 is projected. However, in FIG. 3, a portion that projects beyond a plane is a region directly below the heating element 22. Therefore, the write element 5 or the read element 6 is spaced from the magnetic disk by this projecting distance, causing the recording density or reproducing accuracy to not be sufficiently increased or improved.

On the other hand, in the situation shown in FIG. 5, since the read element 5 and the write element 6 projects more than other portions, recording density or reproducing accuracy can be increased or improved compared with the prior-art example.

Figure 6:
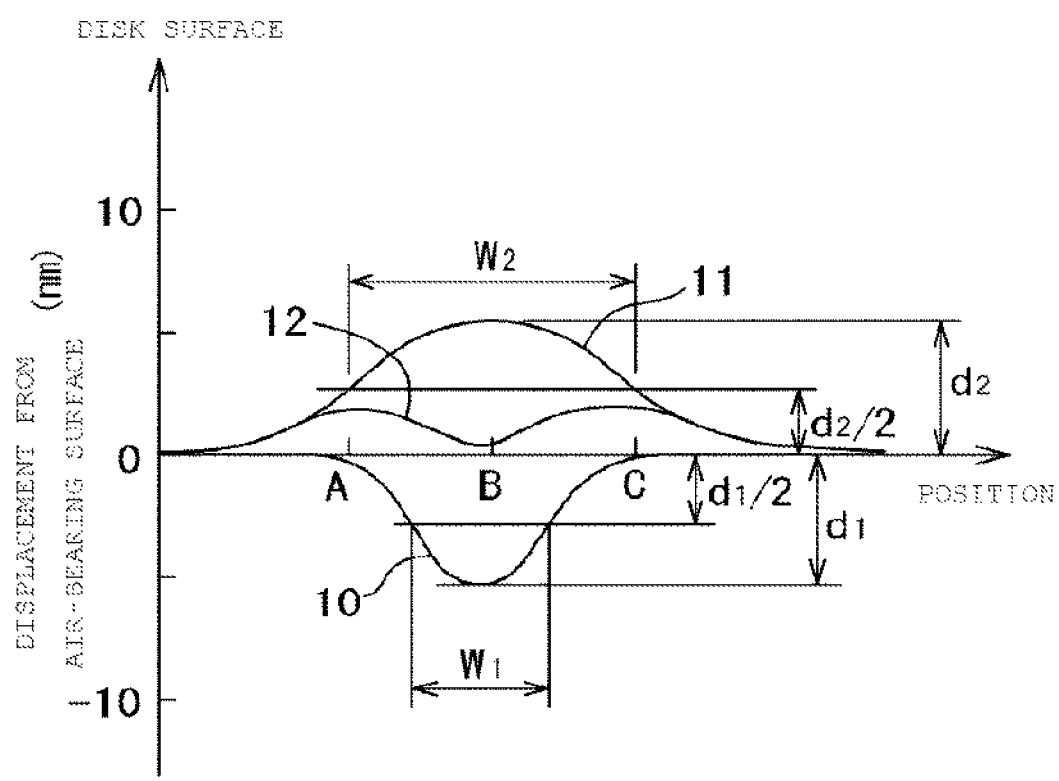
FIG. 6 is a graph showing change in air-bearing surface of the magnetic head of the invention between a case where power is applied to the heating element and a case where power is not applied.

FIG. 6 shows a comparison between an ABS shape 10 of FIG. 1, an ABS shape 12 of FIG. 5, and an amount of change shape 11 from the shape 12 to the shape 10. That is, shape 10 in FIG. 6 shows the ABS shape in FIG. 1; namely, an ABS shape in a condition where the heating element 22 is not flowed with a current, and shape 12 in FIG. 6 shows the ABS shape in FIG. 5; namely, an ABS shape in a condition where the heating element 22 is flowed with a current. In addition, shape 11 in FIG. 6 shows a result of subtracting the shape 10 from the shape 11 in FIG. 6, which corresponds to amount of deformation of a magnetic ABS due to flowing a current into the heating element 22. Here, the amount of change shape 11 is approximately equal to a projecting amount of the ABS in the situation where the heating element 22 is flowed with a current and thus heated in the prior-art example shown in FIG. 3.

In FIG. 6, a horizontal axis shows a position in a horizontal direction in FIG. 1, and a vertical axis shows displacement from an ABS. In FIG. 6, the ABS refers to a planar portion or a region where the depression portion is not formed in a lower part of the magnetic head of FIG. 1. In FIG. 6, a magnetic disk exists on the upper side of the vertical axis, namely, on a plus side.

In FIG. 6, a position A on the horizontal axis corresponds to a read element portion, a position B corresponds to a portion close to the heating element, and a position C corresponds to a main pole portion of the write element. In a prior-art magnetic head, as shown in FIG. 3, when the heating element is applied with power, an ABS shape is deformed such that an ABS close to a heating element portion is most protrusively deformed and thus becomes a region closest to the magnetic disk. Therefore, in the previous magnetic head, the read element and the write element cannot further approach a surface of the magnetic disk, and consequently magnetic spacing cannot be reduced. As is specifically show in FIG. 6, a difference between displacement of a portion at B and displacement of a portion at A or C in the change shape 11 corresponds to magnetic spacing loss.

On the other hand, in the ABS shape shown in FIG. 5 or shown by shape 12 in FIG. 6, a portion that projects the most from the ABS 3 corresponds to a read element portion or a write element portion, and therefore each element portion may approach a magnetic disk surface more than any other. Consequently, magnetic spacing can be reduced.

The ABS shape 10, which is formed to achieve the ABS shape 12, is defined as a difference between the shape 11 and the shape 12, and when it is assumed that depth of a deepest portion of a depression portion of the shape 10 is $d_1$, a ratio $d_1/W_1$ of the depth to average diameter $W_1$ of a portion having a depth of $d_1/2$ is curvature $R_1$, amount of change of a largest displacement portion of the shape 11 is $d_2$, and a ratio $d_2/W_2$ of the amount of change to average radius $W_2$ of a portion having an amount of change of $d_2/2$ is $R_2$, $R_1 \geq 2*R_2$ needs to be established. An interval between the read element portion and the write element portion is about 10 μm to about 20 μm, and at least $W_1$ is not more than about 20 μm. In addition, $d_1$ is equal to or more than $d_2$, and is specifically between about 5 nm to about 20 nm.

To achieve such a shape, a curvature may be increased at a deep portion of the depression portion shown in FIG. 1. To form such a depression having a shape with a large curvature in an ABS, a new method has been devised by using a difference in shape depending on a response time of deformation by heating against a previously known method by polishing the ABS, and effectiveness of the new method has been confirmed.

Figure 9:
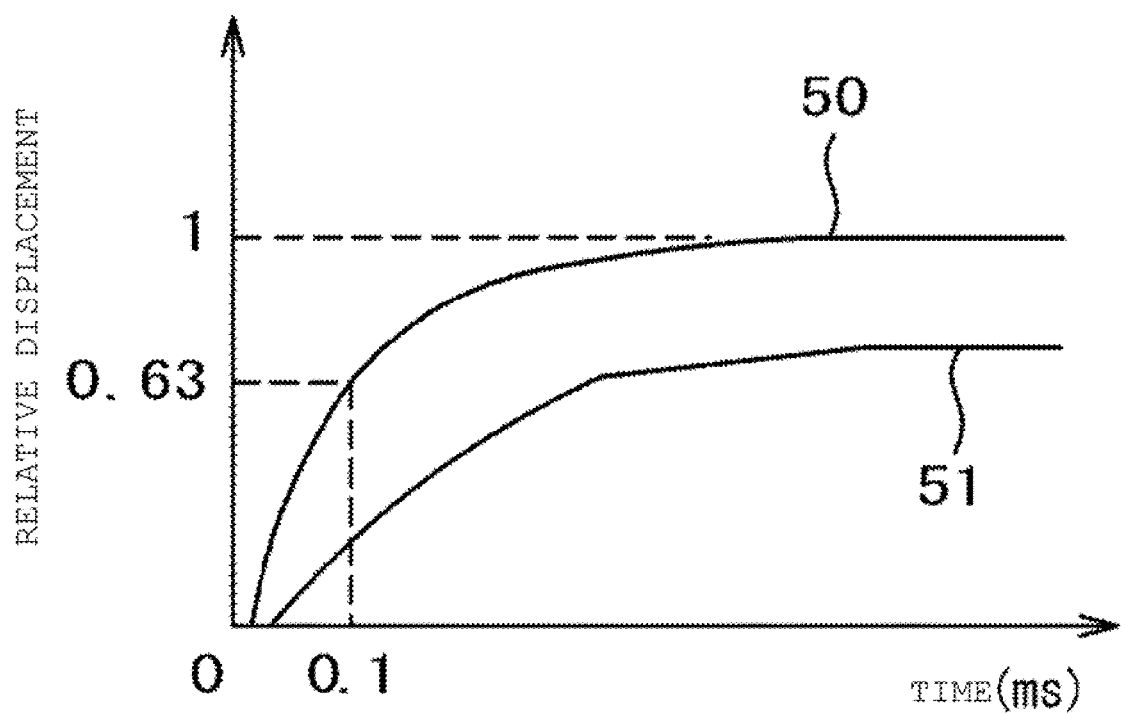
FIG. 9 is a diagram showing change in air-bearing surface shape with elapsed time with respect to power applied to the heat element of the magnetic head according to the invention.

FIG. 9 shows a result of obtaining, by simulation, shape change 50 of a portion close to the heating element and shape change 51 of a portion at a position spaced by 25 μm from the portion close to the heating element with respect to power applied in a step manner. Power is applied at a point of time 0, and a time constant of the change at the portion close to the heating element is about 100 μsec. On the other hand, the change is 30% or less at a point of 100 μsec at the position spaced by 25 μm. It was known from these that the portion close to the heating element first expanded during transient response, and as a distance from the portion increased, longer time was taken for heat transfer; in addition, shape change was gradually delayed. Using such a phenomenon, power is applied in a short pulse form, thereby only the periphery of the heating element is greatly changed in shape, and consequently curvature of a depression shape can be increased.

Figure 7:
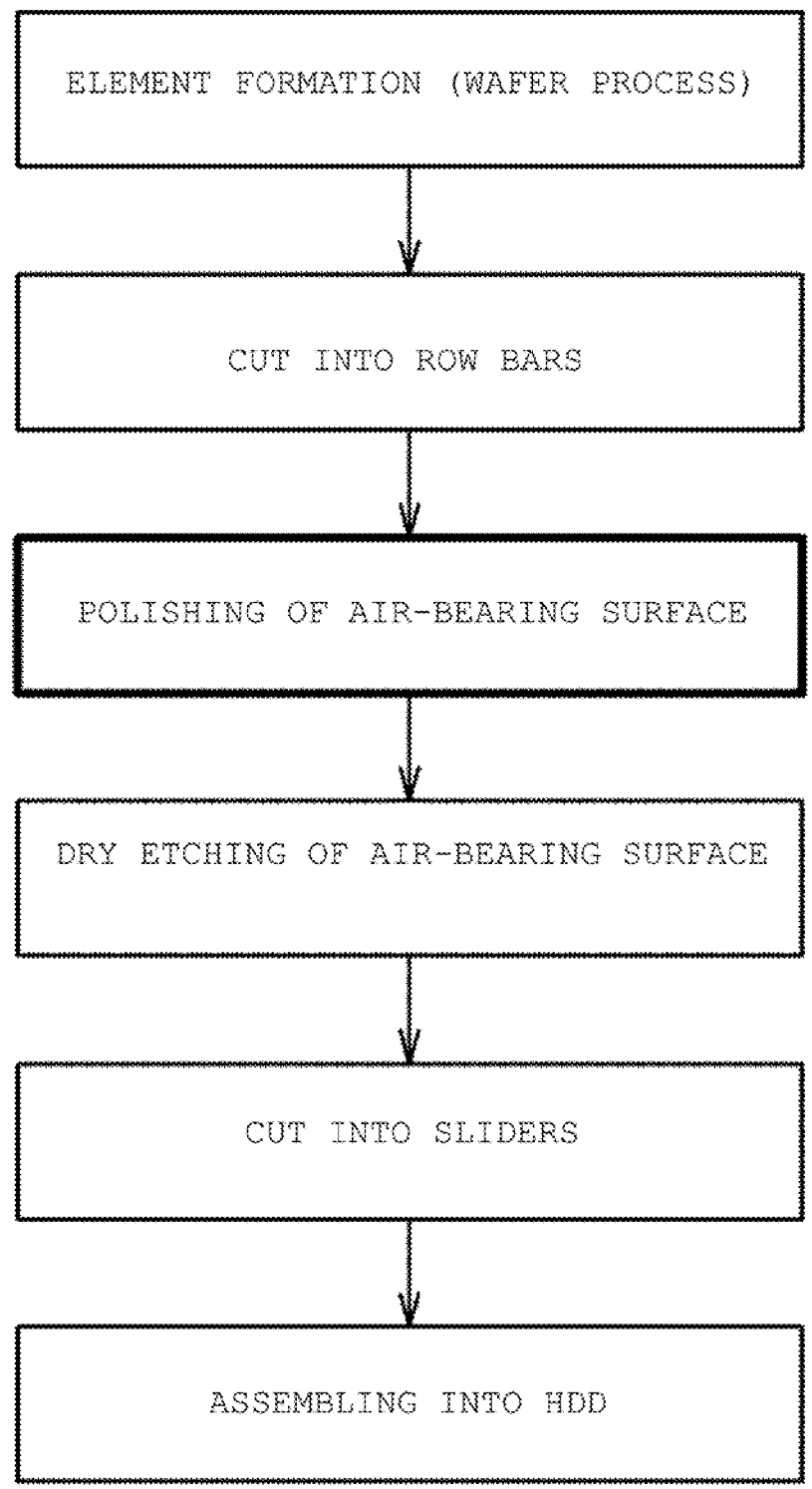
FIG. 7 is a flow chart of a processing process of the magnetic head according to the invention.

Hereinafter, on a method of polishing an ABS of a magnetic head is described according to one example. FIG. 7 shows a manufacturing process flow of the magnetic head of the example. Elements are formed on a ceramic wafer, then strip row bars, on each of which 40 to 60 sliders are arranged in line, are cut out, and a cut surface of the row bar is smoothly finished by polishing to be an ABS. Next, flying-surface stepping processing is performed by dry etching of an ABS in order to stabilize a flying height when the ABS flies over a disk. Furthermore, each row bar is cut into sliders, and each slider is assembled in a HDD and thus the process is finished.

Figure 8:
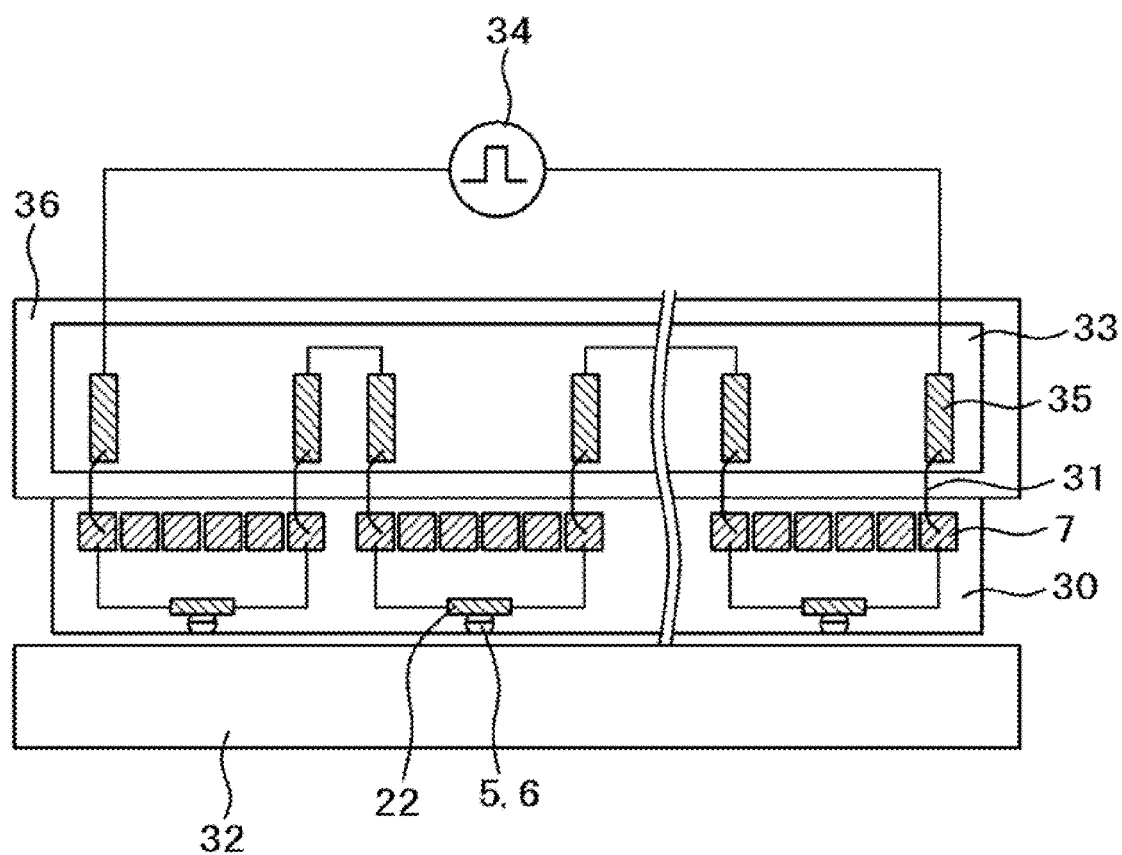
FIG. 8 is a schematic view showing a step of polishing air-bearing surfaces on a row bar according to the invention.

FIG. 8 shows a method of processing an ABS of a magnetic head by using a polishing machine. In a polishing step, magnetic heads are processed in a state of a row bar on which 40 to 60 magnetic head sliders are arranged in line. An ABS of a row bar 30 is contacted by pressure to a polishing platen 32, in which abrasive grains are beforehand buried in a surface, for example via a lubricating oil, and the polishing platen 32 is rotated to polish a surface of the row bar.

The polishing step is intended to improve flatness of an ABS, and furthermore, intended to process length in a depth direction from an ABS of each of the read element 20 and the write element main-pole 21 to have a desired value. Therefore, a resistance element is provided for knowing a processing endpoint, and wiring and a circuit are provided for detecting resistance of the resistance element. However, these elements are omitted in the figure.

A heating element 22 is formed on each slider element on the row bar, and either end of the heating element is connected to one of the electrode pads 7. The row bar is adhered onto a polishing jig 36 having a connection substrate 33, and the electrode pads 7 connected with respective heating elements on the row bar are connected by wire bonding to corresponding connection pads 35 on the connection substrate 33, and heating elements are connected in series or parallel to one another on the connection substrate 33. Current is supplied from a pulse power supply 34 to the heating elements 22 via the connection pads 35.

Resistance of the heating element is 30Ω to 300Ω, and an element of 100Ω was used in the example. If all the elements on the row bar are connected in series, a voltage between both ends is extremely increased depending on applied power, leading to a safety problem. Therefore, the elements are divided by several elements into groups, and the elements in each group are connected in series to one another, and the groups are connected in parallel to one another, so that supply voltage is appropriately adjusted.

In the actual polishing, power was applied to the heating elements from 50 nm before a target dimension of a read element in processing amount. As an applied power pattern, repetition pulse power was used, in which pulse width Tw was 20 μsec to 40 μsec, and a repetition period Tp was 400 μsec.

Figure 12:
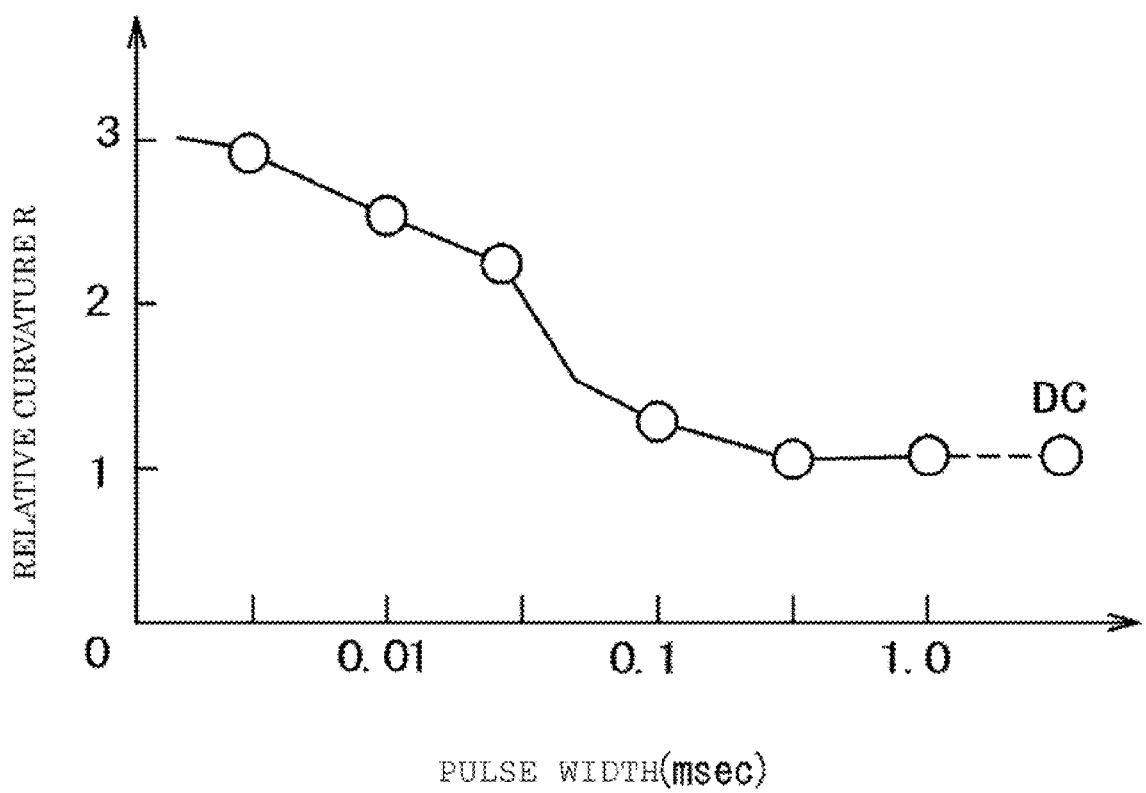
FIG. 12 is a graph showing a relationship between pulse width of a power pulse applied to the heat element during polishing the magnetic head of the invention and relative curvature of a depression in the air-bearing surface.

The reason why a pulse interval was set to be several times larger than the time constant is that heat generation due to power applied in a pulsed manner is sufficiently diffused so as to prevent temperature rise around a heating element. That is, if the interval is short, curvature is not different from curvature in the situation where DC power is applied as shown in FIG. 12. FIG. 12 is described later.

Figure 10:
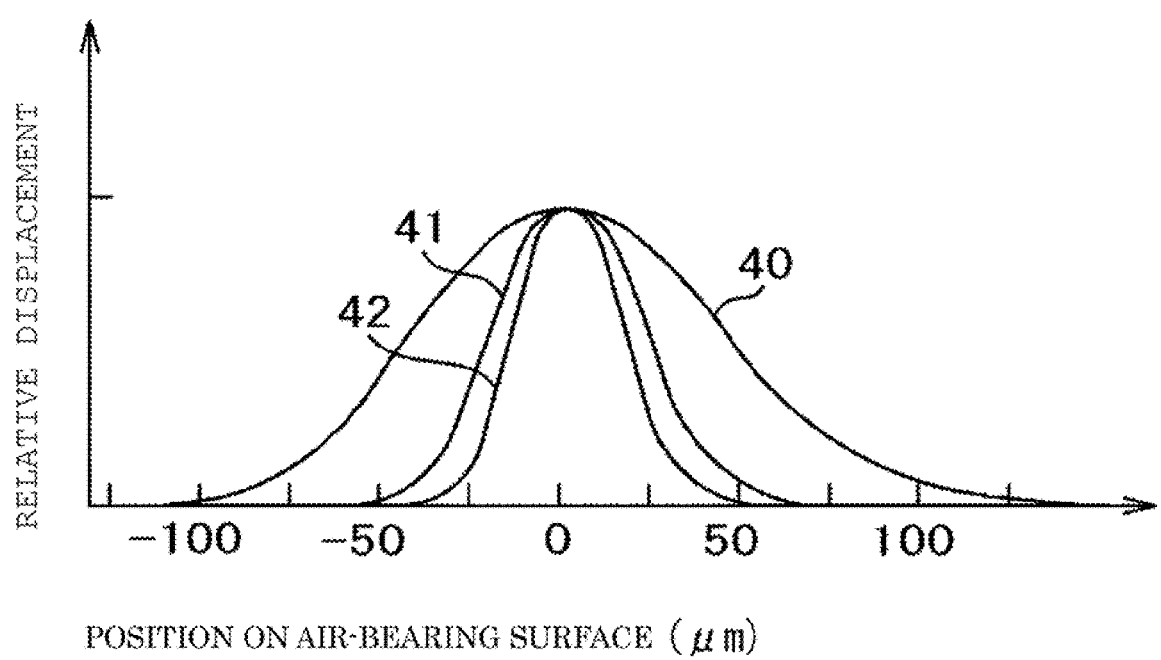
FIG. 10 is a comparison diagram of a air-bearing surface shape of the magnetic head according to the invention with respect to power application time.

FIG. 10 shows a shape of a depression portion in an ABS formed at a condition as shown in FIG. 12. In FIG. 10, displacement by a depression in the ABS is normalized by a maximum depression value to compare differences in shape. A plot 40 in FIG. 10 shows an ABS shape in the situation where DC power is applied, and forms approximately the same shape as in the situation where DC power is applied to a heating element on a disk. A plot 41 in FIG. 10 shows a situation where the ABS is processed with a pulse width of 40 μsec, and a plot 42 in FIG. 10 shows a situation where the ABS is processed with a pulse width of 20 μsec. In both cases, the ABS is processed with a shape having a curvature at least twice as large as curvature in the case of DC power. When pulses having the same duty are applied, larger curvature can be obtained as pulse width is shorter.

Figure 11:
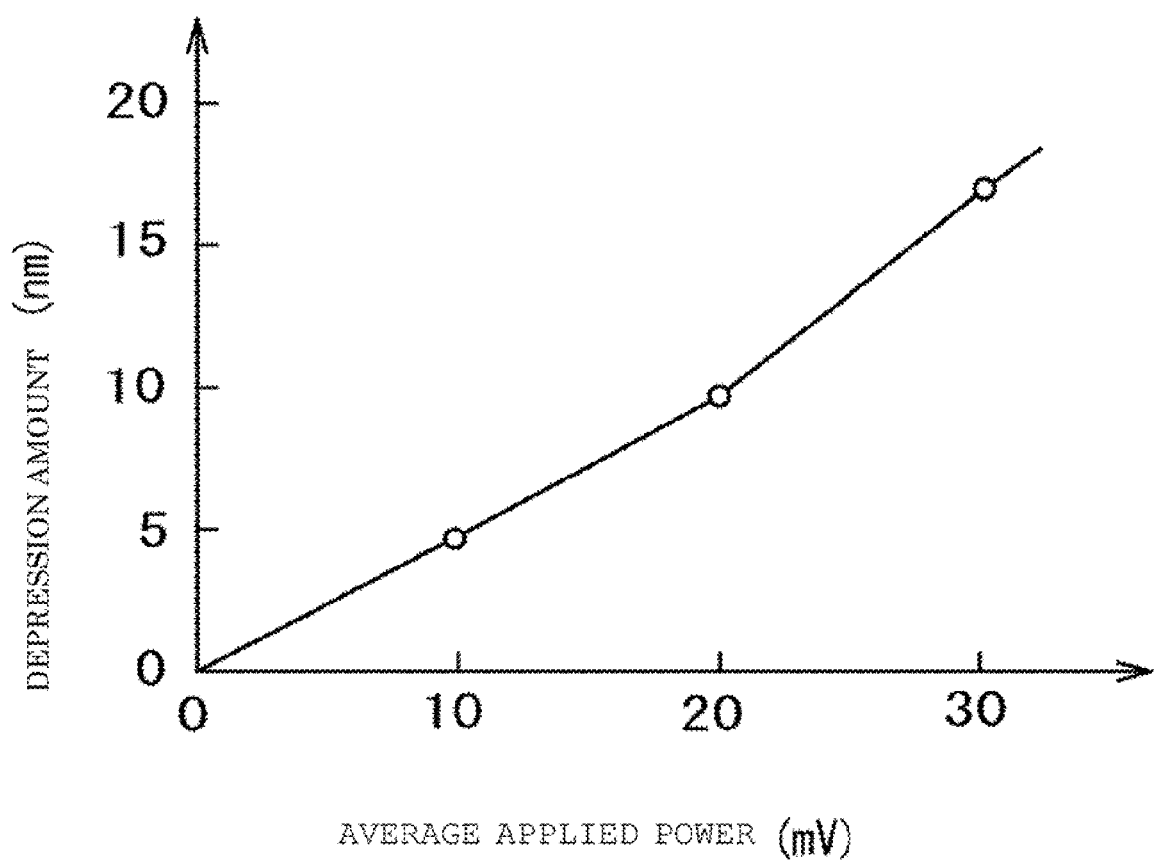
FIG. 11 is a graph showing a relationship between average power applied to the heat element during polishing the magnetic head of the invention and depression amount of the air-bearing surface.

FIG. 11 shows a relationship between average applied power and processed depression amount. In FIG. 11, a horizontal axis shows an average power applied to the heating element 22, and a vertical axis shows a depression amount of a depression portion in the ABS. In FIG. 11, pulse width is 40 μsec, and a pulse period is 400 μsec. As shown in FIG. 11, a depression amount of 10 nm can be obtained with an average power of 20 mW.

In FIG. 12, curvature of processed depression portions are plotted with relative values with respect to a pulse width of applied power, the relative values being given in the case that curvature is assumed as 1 when DC power is applied. In FIG. 12, a horizontal axis shows pulse width. Pulse duty is fixed to ⅟10. A vertical axis shows relative values of curvature of the depression portion in the ABS in FIG. 1.

FIG. 12 is a graph showing a relationship between pulse width and curvature of a depression. As described in FIG. 9, a time constant of the portion close to the heating element 22 of the magnetic head is 100 μsec. It is known from FIG. 12 that while at least double curvature can be obtained with a pulse width of not more than 50 μsec that is half of the time constant of step response, 100 μsec, when pulse width is equal to or more than the time constant of 100 μsec, a difference in shape disappears unlike the situation where DC power is applied.

Figure 13:
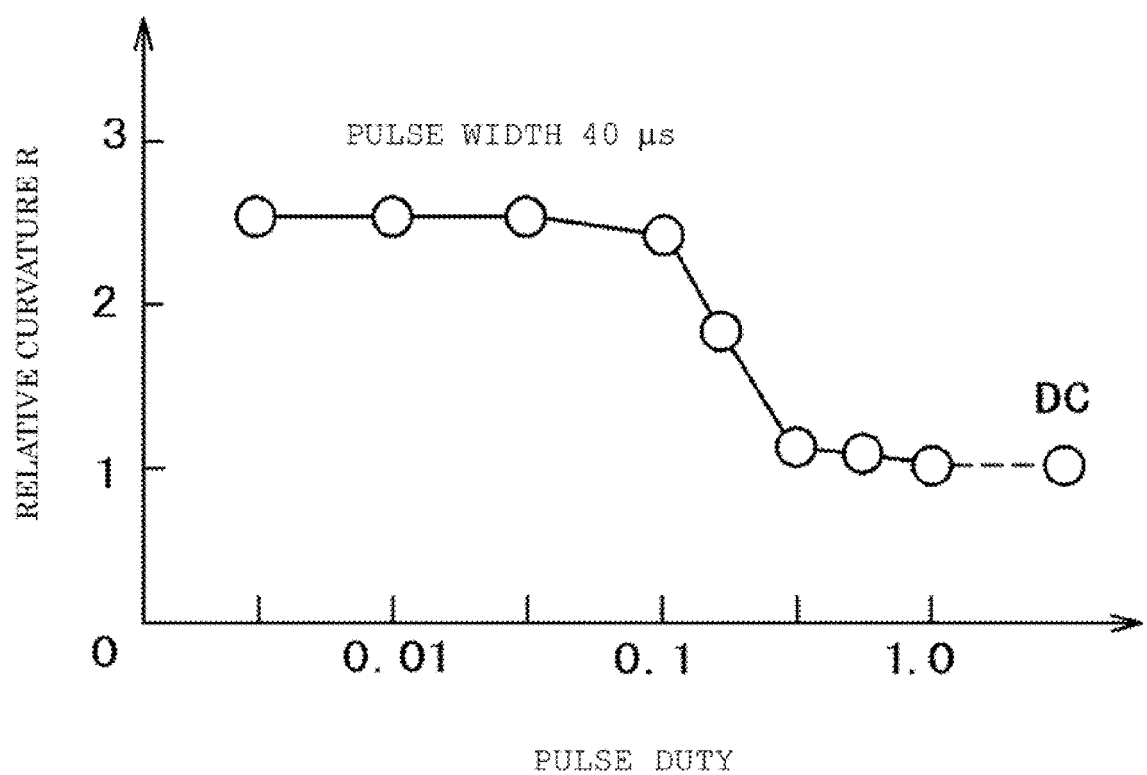
FIG. 13 is a graph showing a relationship between duty of a power pulse applied to the heat element during polishing the magnetic head of the invention and relative curvature of a depression in the air-bearing surface.

FIG. 13 is a graph obtained by plotting a relationship between duty of an applied power pulse and relative curvature. In FIG. 13, a horizontal axis shows duty of a pulse applied to the heating element 22, and a vertical axis shows relative values of curvature of the depression portion in the ABS in FIG. 1. In FIG. 13, pulse width is fixed to 40 μsec.

In FIG. 13, at least double relative curvature can be obtained in a duty range of less than 0.1, but in a duty range of 0.1 or more, a shape is not different from that in the case of DC power. This is considered to be because time is not sufficient for radiating heat generated by input power as described before, therefore heat corresponding to average power induces the same temperature distribution as in the situation where DC power is applied. In FIG. 13, duty is set to be 0.25 or less, thereby curvature can be made large compared with the situation where DC power is applied to the heating element 22.

FIG. 12 shows a situation where pulse width is changed while duty of a pulse applied to the heating element 22 is fixed in order to give the desired curvature to the shape of the depression portion in the ABS of the magnetic head. FIG. 13 shows a situation where pulse duty is changed while pulse width is fixed (to 40 μsec).

A condition for obtaining the magnetic head, according to some embodiments, is not limited to the condition as shown in FIG. 12 or 13. As a condition for obtaining the magnetic head, time width Tw of 1 pulse is set to be 200 μsec or less, and an interval between pulses is set to be 800 μsec or more, thereby a desired shape of a magnetic head can be obtained.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, having:
    a write element;
    a read element; and
    a heating element disposed between the write element and the read element,
    wherein when power is applied to the heating element, either the read element or the write element projects beyond a plane of an air-bearing surface (ABS) of the magnetic head, and
    wherein when power is not applied to the heating element, a portion of the ABS of the magnetic head facing a magnetic disk close to the heating element has a concave shape.

2. The magnetic head of claim 1, wherein when power is applied to the heating element, at least one of a portion of the read element and a portion of the write element approaches a magnetic disk.

3. A method of manufacturing a magnetic head as recited in claim 1, the method comprising:
    cutting into strip row bars a wafer substrate on which a plurality of the write elements and a plurality of the read elements are formed, such that the write elements and the read elements are arranged in a line; and
    polishing each cut surface such that a dimension in a direction perpendicular to the cut surface of each of the write elements and the read elements has a desired value, and a flatness of each of the write elements and the read elements has a desired degree of flatness,
    wherein pulsed power with a constant interval is applied to the heating element when less than about 10 nm is remaining to remove via polishing.

4. A system, comprising:
    a magnetic storage medium;
    at least one magnetic head as recited in claim 1 for reading from and/or writing to the magnetic storage medium;
    a slider for supporting the magnetic head; and
    a control unit coupled to the magnetic head for controlling operation of the magnetic head.

5. A magnetic head, comprising:
    a write element;
    a read element; and
    a heating element disposed between the write element and the read element,
    wherein when power is applied to the heating element, either the read element or the write element projects beyond a plane of an air-bearing surface (ABS) of the magnetic head,
    wherein when power is not applied to the heating element, a portion of the ABS of the magnetic head facing a magnetic disk close to the heating element has a concave shape,
    wherein when power is applied to the heating element and an amount of deformation of an ABS surface toward the magnetic disk on a surface parallel to the magnetic disk is plotted, a second ratio, $R_2$, adheres to $R_2 = d_2/W_2$, where a maximum of an amount of deformation toward the magnetic disk is $d_2$, and an average width of the deformation at a portion of the plot corresponding to $d_2/2$ is $W_2$, and
    wherein a first ratio, $R_1$, adheres to $R_1 = d_1/W_1 \geq 2*R_2$, where $d_1$ is a depth of a deepest portion of a concave shape on the plot, and $W_1$ is an average width of the concave shape at a portion of the plot corresponding to $d_1/2$.

6. The magnetic head of claim 5, wherein when power is applied to the heating element, at least one of a portion of the read element and a portion of the write element approaches a magnetic disk.

7. A system, comprising:
    a magnetic storage medium;
    at least one magnetic head as recited in claim 5 for reading from and/or writing to the magnetic storage medium;
    a slider for supporting the magnetic head; and
    a control unit coupled to the magnetic head for controlling operation of the magnetic head.

8. A system, comprising:
    a magnetic storage medium;
    at least one magnetic head as recited in claim 1 for reading from and/or writing to the magnetic storage medium;
    a slider for supporting the magnetic head; and
    a control unit coupled to the magnetic head for controlling operation of the magnetic head.

* * * * *